3,791,990
OIL ABSORBENT

Karl Otto Paul Fischer, Chilliwack, British Columbia, Canada, assignor to Fischer Holdings Ltd., Chilliwack, British Columbia, Canada
No Drawing. Filed Jan. 3, 1972, Ser. No. 215,165
Int. Cl. B01j 1/22
U.S. Cl. 252—427                                              6 Claims

ABSTRACT OF THE DISCLOSURE

An oil absorbent material, specifically peat, having a moisture content of less than ten percent by weight for use particularly in removing oil film from water.

BACKGROUND OF THE INVENTION

Field of the invention

This invention relates to oil absorbent materials capable of floating in water, and to a method of producing such materials.

Prior art

Removal of oil, particularly from the surface of open waters, has always posed a problem which, of recent years, has been more serious due to increased world consumption of petroleum.

It is well known that oil film contamination can cause heavy damage to aquatic life as oil films notably retard penetration of oxygen into water and that oil washed on beaches destroys foreshore marine life.

Various methods have been tried to remove oil film from water. One of the most successful methods involves the use of oil absorbent materials which can be spread on, and float on, oil covered waters to absorb the oil film, and then can be picked up so that the oil can be recovered or otherwise disposed of.

Oil absorbent qualities of certain organic materials, for example, peat, textile fibers, sawdust, and the like, are well known. However, it has always been considered that such materials are hydrophilic, i.e. they tend to absorb water and although they will absorb oil on the surface of the water they will also absorb a quantity of water as well. Consequently, these organic materials have been treated to render them hydrophobic, i.e. essentially non-water absorbent.

U.S. Pat. 3,464,920 to Pirson et al. discloses treatment of comminuted organic material with organosilane compounds to render the material hydrophobic.

U.S. Pat. 3,562,153 to Tully et al. discloses the use of colloid hydrophobic metals or metalloid oxides for treating absorbing material to render the material hydrophobic.

Treatment of organic material by addition of hydrophobic compounds is, of course, costly, since vast quantities of such materials are to be used in major oil spills.

SUMMARY OF THE INVENTION

It has been discovered that peat with reduced moisture content as above losses its hydrophilic qualities and becomes, essentially, hydrophobic.

The present invention contemplates the use of peat having a water content of less than ten percent by weight as an oil absorbent material. The invention also includes a method for handling and separating peat fiber from peat fines before drying.

In accordance with the present invention water content of peat is reduced mechanically to seventy-five percent by weight. The peat is screened to separate the peat into peat fiber and peat fines having a maximum length of 0.5 mm. to 5 mm. The peat fiber and peat fines are then dried separately to a moisture content of less than ten percent by weight.

DETAILED DESCRIPTION

Preparation

In processing peat for use as an oil absorbent, raw peat transported directly from peat beds and which normally has a water content of about ninety percent by weight, is mechanically dried in roller presses to about a seventy-five percent water content, by weight. The mechanically dried peat is then passed over vibrating screens having a screen opening size in the range 0.5 mm. to 5 mm.—1 mm. being considered most suitable—to separate the peat into peat fiber and peat fines.

The peat fines and the peat fiber are then thermically dried separately in hot air at about one hundred degrees centrigrade until moisture content of both peat fiber and peat fines is between eight and ten percent by weight of the peat. The dried material, if it is to be stored for a lengthy period, can be packed in moisture proof containers so that the peat maintains its thermically dried condition.

The mechanically dried peat is separated into fiber and fines prior to thermically drying as the peat fibers have a much higher water saturation capacity than the fines. Fines which are partially decomposed peat particles, have a greater surface area than an equal weight of the fibers so that if both fibers and fines were thermically dried en mass they would have different moisture contents.

Use

Both types of peat, that is the fibers and fines exhibit marked hydrophobic qualities. Both fiber and fines when spread on water readily float, do not tend to separate and do not tend to absorb water. On the other hand both fiber and fines exhibit excellent oil absorbent qualities and do not sink when oil laden.

EXAMPLE 1

One liter of peat fines was spread on oil covered water. A petroleum oil having a weight of SAE 20 was used. After two minutes the peat became an oil laden compact mass floating on the water. Water level remained constant showing that very little if any water was absorbed. Comparison by weight of dried peat and the oil soaked peat indicated that one liter of dried peat absorbed one liter of oil.

EXAMPLE 2

One liter of peat fines was spread on clean water. The fines did not spread but retained a compact form. After one hour the peat mass was removed from the water and other than the water droplets clinging to an under side of the peat mass the peat mass was dry.

The foregoing examples show that peat fines when dried to a moisture content of less than ten percent by weight is essentially hydrophobic rather than hydrophilic.

EXAMPLE 3

To ascertain the oil absorbent qualities of peat fines with oil alone, oil having a weight of SAE 20 was poured on a clean dry metallic surface and a quantity of peat fines spread over the oil. The oil was immediately absorbed leaving the metalic surface substantially free of liquid. The metallic surface exhibited only a wetted appearance normally presented by metallic surfaces rubbed with a piece of oily waste. The oil soaked peat could easily be lifted as a mass from the metallic surface.

The oil absorbent hydrophobic qualities of the peat fiber prepared in accordance with the invention are illustrated in the following examples.

EXAMPLE 4

A test similar to that described in Example 1 was carried out using one liter of peat fiber. Results of the test were the same as described with reference to peat fines in Example 1. Peat fiber had a lower bulk weight than similar quality peat fines (about seventy percent) and absorbed about 0.7 liter of oil indicating that weight for weight the fiber absorbs the same quantity of oil as do peat fines.

EXAMPLE 5

A test similar to that described in Example 2 was carried out using one liter of peat fiber and the results were the same as that described with reference to peat fines in Example 2. The results of both tests indicate that peat fiber like peat fines is essentially hydrophobic rather than hydrophilic.

EXAMPLE 6

A test similar to that described with reference to Example 3 was carried out using peat fiber. The peat fiber did not, when oil soaked, cling together as tightly as did the mass of peat fines and the metallic surface did not exhibit the substantially oil film free appearance as that obtained with the peat fines. The effectiveness of peat fines in removing oil from metallic surfaces is attributed to the greater surface area that the peat fines present to the surface to be cleaned.

It is evident that peat prepared in accordance with the invention is an excellent oil absorbent due to its hydrophobic character, its positive buoyancy when oil laden and its low cost production i.e. requiring little treatment other than screening and drying.

Further due to its ability to absorb oil from metallic surfaces it can, effectively, be used to clean ships storage tanks and the like. Peat fines, for example, can be blown inside a tank then scraped or vacuumed from the tank walls.

What is claimed is:

1. An oil absorbent material having a hydrophobic character thereby being useful for absorbing oil without absorbing substantial quantities of water comprising a mixture of:
    (a) peat fines having a fiber length of less than 5 mm. and a moisture content of about 8-10%, and
    (b) peat fibers having a fiber length of greater than 5 mm. and a moisture content of about 8-10%,
    (c) said peat fibers and peat fines being dried separately to their respective moisture contents before mixing into said mixture.

2. An oil absorbent material as claimed in claim 1 in which the peat fines have a fiber length of less than 1 mm.

3. A method of treating peat for use as a hydrophobic oil absorbent material comprising:
    (a) mechanically drying peat to a water content of less than 75% by weight,
    (b) separating the mechanically dried peat into peat fibers having a fiber length greater than 5 mm. and peat fines having a fiber length less than 5 mm.,
    (c) thermically drying said peat fibers and said peat fines separately to the extent that said peat fibers and said peat fines each have a water content of about 8-10% by weight, and
    (d) admixing said dried peat fibers and said dried peat fines thereby producing an oil absorbent material of hydrophobic peat.

4. A method as claimed in claim 3 in which the peat is mechanically dried by passing the peat through pressing rollers.

5. A method as claimed in claim 3 in which the peat fiber and peat fines are separated on vibrating screens.

6. A method as claimed in claim 3 in which the peat fiber and peat fines are thermically dried in currents of warm air heated to one hundred degrees centigrade.

References Cited

UNITED STATES PATENTS

| | | | |
|---|---|---|---|
| 1,229,637 | 6/1917 | Merkel | 44—33 X |
| 1,532,344 | 4/1925 | Plummer | 44—33 |
| 2,668,099 | 2/1954 | Cederquist | 44—33 |
| 3,382,170 | 5/1968 | Pape | 210—DIG. 21 |
| 3,673,095 | 6/1972 | Archer | 252—427 X |

FOREIGN PATENTS

| | | | |
|---|---|---|---|
| 671,878 | 5/1952 | Great Britain | 44—33 |
| 717,337 | 10/1954 | Great Britain | 44—33 |
| 1,595,406 | 7/1970 | France | 210—40 |

PATRICK P. GARVIN, Primary Examiner

U.S. Cl. X.R.

210—40